(12) United States Patent
McWayne et al.

(10) Patent No.: US 10,125,034 B2
(45) Date of Patent: Nov. 13, 2018

(54) PERMEABLE REACTIVE WEIR

(71) Applicant: Erick McWayne, Kent, WA (US)

(72) Inventors: Erick McWayne, Kent, WA (US);
Howard Sprouse, Bellevue, WA (US)

( * ) Notice: Subject to any disclaimer, the term of this patent is extended or adjusted under 35 U.S.C. 154(b) by 335 days.

(21) Appl. No.: 14/275,430

(22) Filed: May 12, 2014

(65) Prior Publication Data

US 2015/0321927 A1   Nov. 12, 2015

(51) Int. Cl.
| | | |
|---|---|---|
| *B01D 27/10* | (2006.01) | |
| *C02F 1/44* | (2006.01) | |
| *C02F 1/28* | (2006.01) | |
| *C02F 1/00* | (2006.01) | |
| *C02F 101/16* | (2006.01) | |
| *C02F 101/30* | (2006.01) | |
| *C02F 101/32* | (2006.01) | |
| *C02F 103/00* | (2006.01) | |

(52) U.S. Cl.
CPC ............ *C02F 1/44* (2013.01); *C02F 1/001* (2013.01); *C02F 1/281* (2013.01); *C02F 1/283* (2013.01); *C02F 1/286* (2013.01); *C02F 2101/16* (2013.01); *C02F 2101/306* (2013.01); *C02F 2101/32* (2013.01); *C02F 2101/327* (2013.01); *C02F 2103/007* (2013.01); *C02F 2201/006* (2013.01); *C02F 2201/007* (2013.01); *C02F 2301/028* (2013.01)

(58) Field of Classification Search
None
See application file for complete search history.

(56) References Cited

U.S. PATENT DOCUMENTS

| | | | |
|---|---|---|---|
| 3,854,291 A | | 12/1974 | Perkins |
| 3,925,206 A | * | 12/1975 | Dea .................. C02F 3/046 210/104 |
| 4,352,735 A | * | 10/1982 | Turetsky ............ B01D 29/01 210/238 |
| 6,379,543 B1 | | 4/2002 | Bowman |
| 2004/0088914 A1 | * | 5/2004 | Warner ............ A01G 13/0268 47/20.1 |
| 2012/0152864 A1 | * | 6/2012 | Sowerby ........... B01D 17/0214 210/803 |
| 2013/0056424 A1 | | 3/2013 | Kent et al. |

FOREIGN PATENT DOCUMENTS

| | | |
|---|---|---|
| CN | 101845806 A | 9/2010 |
| CN | 102392433 A | 3/2012 |
| CN | 102505665 A | 6/2012 |
| JP | 05-285470 A | 11/1993 |
| JP | 06-154744 A | 6/1994 |

* cited by examiner

*Primary Examiner* — Richard C Gurtowski
(74) *Attorney, Agent, or Firm* — Dean A. Craine, P.S.

(57) ABSTRACT

A permeable reactive weir having at least one outer wall which defines a chamber that holds reactive filter media.

21 Claims, 9 Drawing Sheets

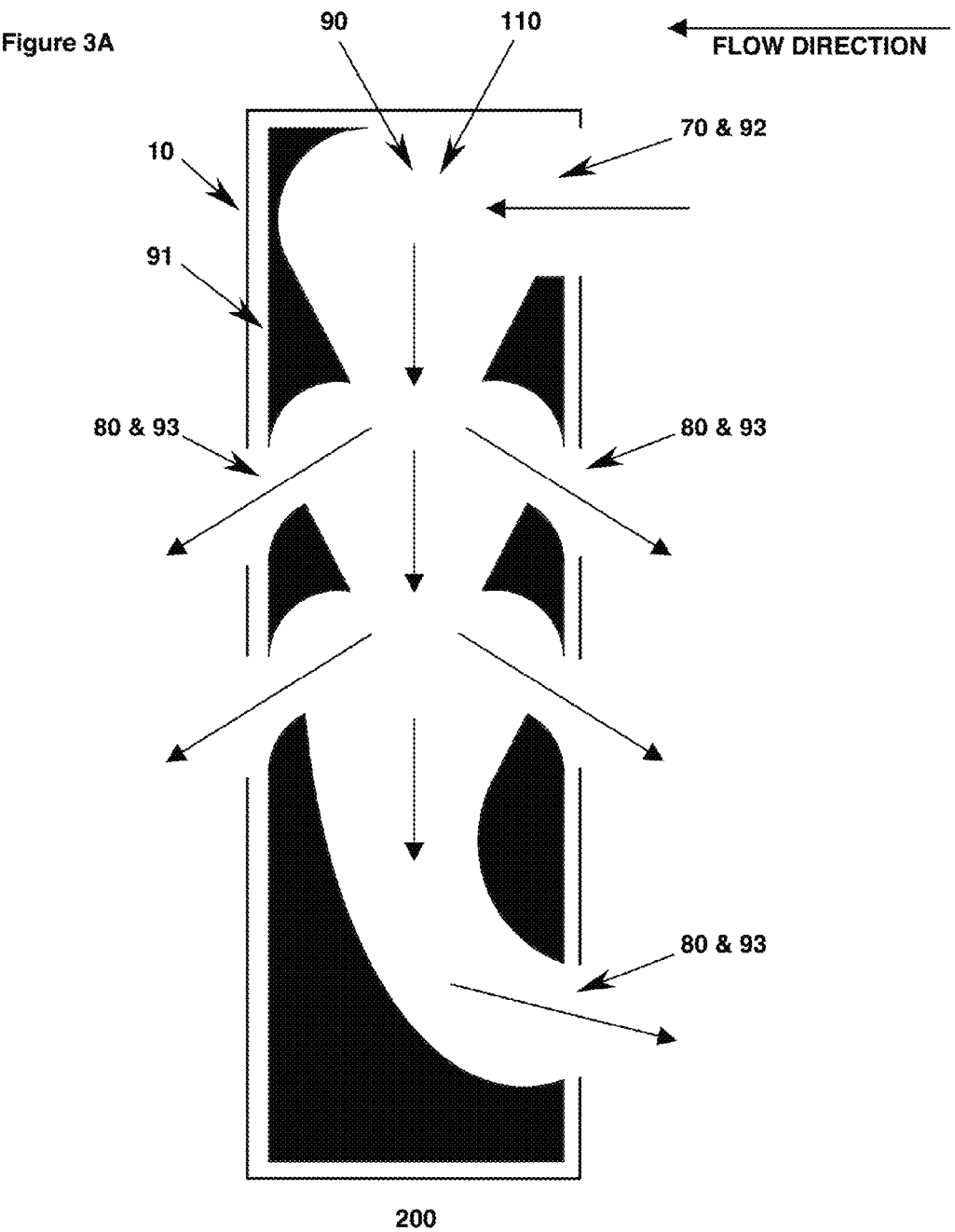

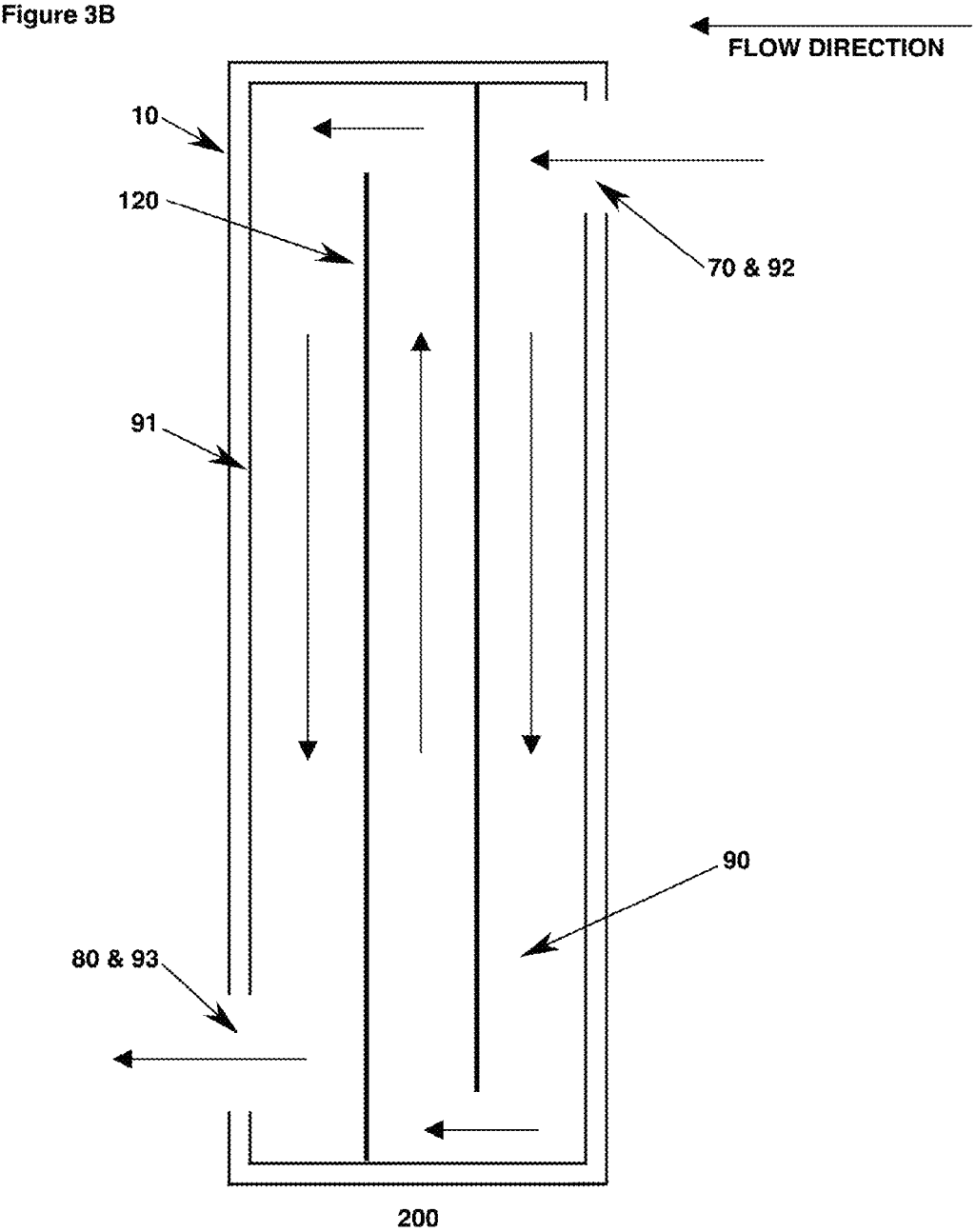

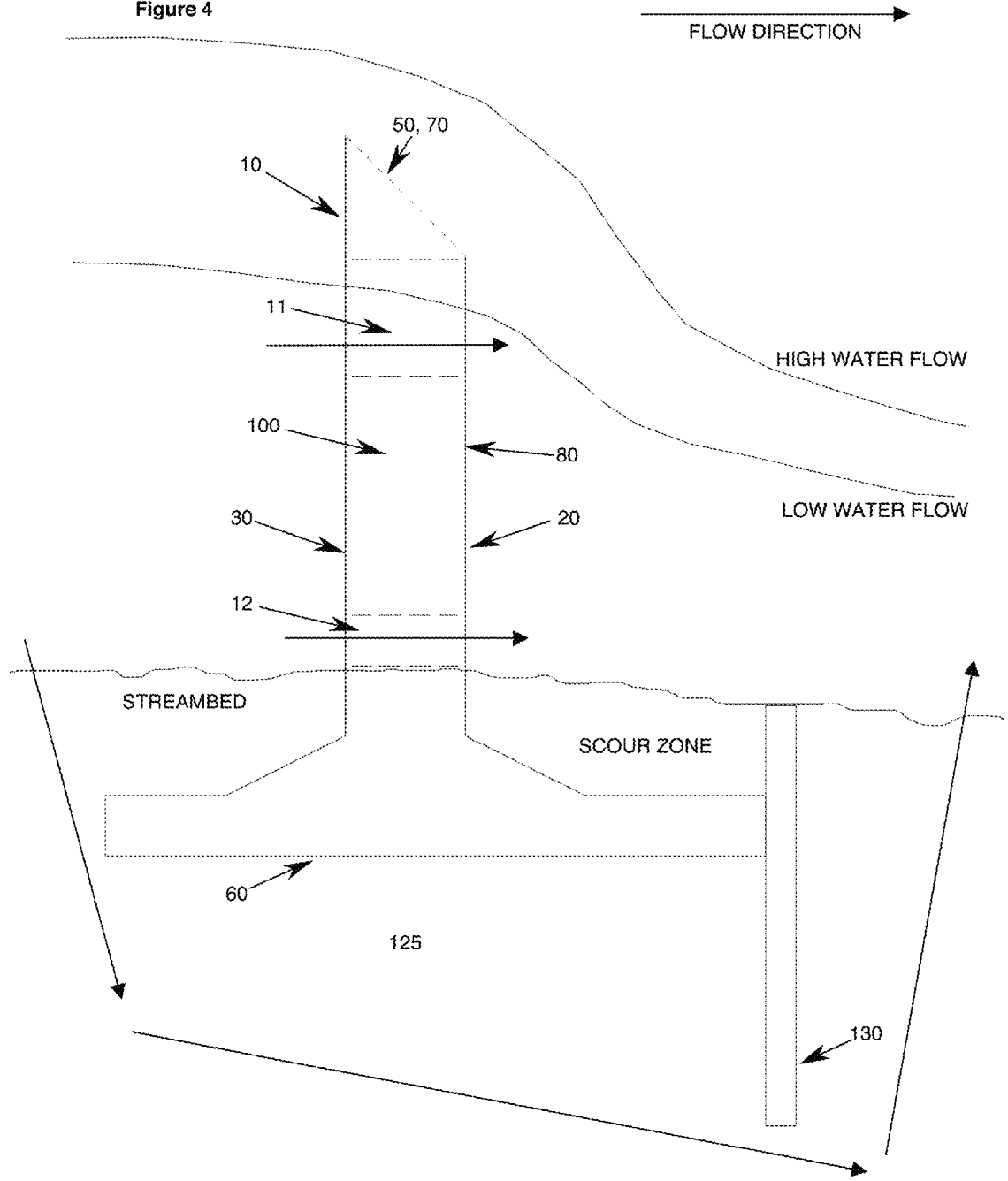

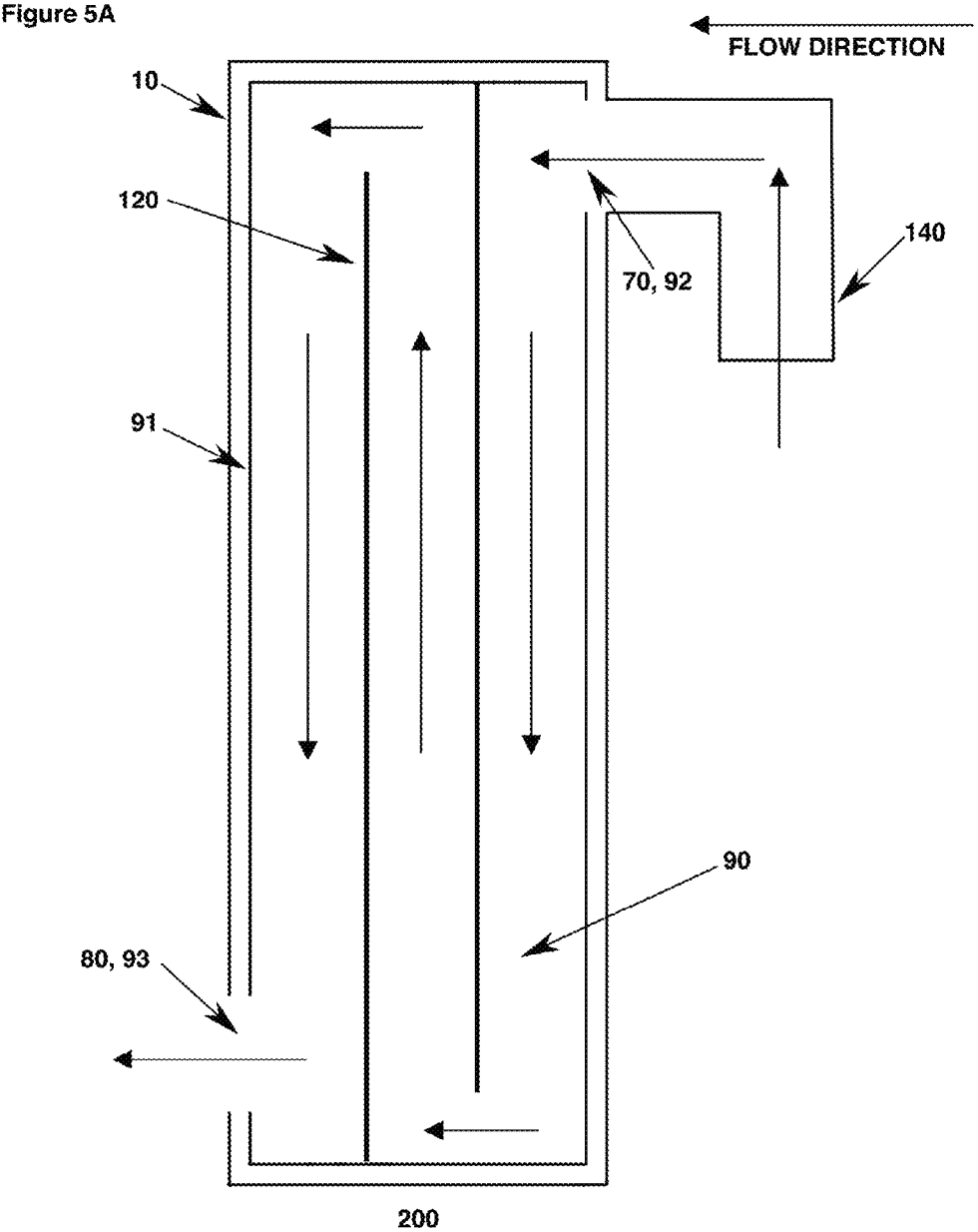

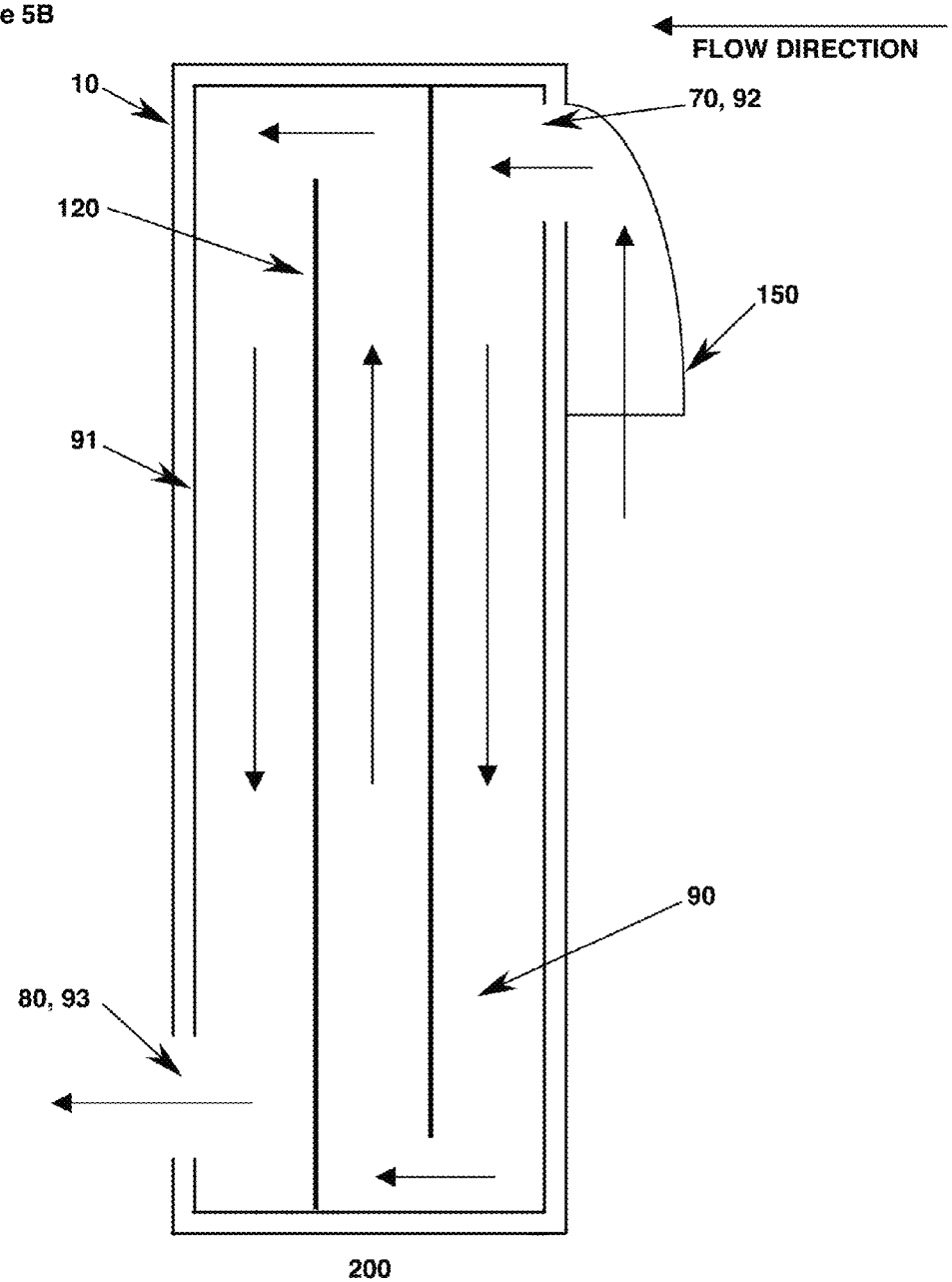

US 10,125,034 B2

PERMEABLE REACTIVE WEIR

CROSS-REFERENCES TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF INVENTION

Contaminants in streams, rivers, and other waterways adversely affect water quality and the ecological balance of the environment. A water filtration device, which can be placed in waterways, can be used to positively affect water quality. Weirs are barriers, usually smaller than dams, are placed across waterways to change the characteristics of water flow. A permeable reactive weir can be used as a water treatment device to improve water quality.

BRIEF DESCRIPTION OF INVENTION

The inventive, permeable reactive weir is comprised of at least one outer wall which defines a chamber that holds reactive filter media ("filter media"). The filter media removes contaminants from fluid and may be renewed or changed to increase the functional lifespan of the permeable reactive weir. The filter media is chosen to address site-specific concerns; e.g., metals, oil and grease, polycyclic aromatic hydrocarbons, pesticides, nutrients, amongst others. Flow through the permeable reactive weir may be controlled through ports on the influent and effluent sides, baffles, and/or valvular conduits or other similar mechanisms. The inventive, permeable reactive weir may be used in a plurality of configurations. For example, at least two permeable reactive weirs may be used in series or parallel; engineered streambeds (i.e., engineered hyporheic zones) may be installed below at least one permeable reactive weir; or a combination thereof. The inventive, permeable reactive weir can improve aquatic habitats by removing pollutants from water, and can improve aquatic habitats by creating upstream pools that allow suspended solids to settle, and downstream cascades that increase dissolved oxygen. Engineered hyporheic zones can also improve aquatic habitats by removing pollutants from water and lowering water temperatures.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which:

FIG. 3A is a schematic showing fluid flowing through an exemplary weir comprising a valvular conduit;
FIG. 3B is a schematic showing fluid flowing through an exemplary weir comprising baffles;
FIG. 4 is a side view of an exemplary weir.
FIG. 5A is a schematic of an exemplary weir showing an influent port with a drawdown orifice.
FIG. 5B is a schematic of an exemplary weir showing an influent port with a hood.

DETAILED DESCRIPTION OF THE INVENTION

The present invention is a permeable reactive weir used to remove pollutants from fluid. Multiple embodiments of the invention are described hereinafter with reference to the accompanying drawings. This invention may, however, be embodied in many different forms and should not be construed as limited to the embodiments set forth herein; rather, these embodiments are provided so that this disclosure will be thorough and complete and will fully convey the scope of the invention to those skilled in the art. For exemplary purposes, the inventive, permeable reactive weir is described as it would be used in a waterway. However, a person having ordinary skill in the art will understand that the inventive, permeable reactive weir may be used to treat any kind of fluid. Accordingly, fluid and water are used interchangeably throughout these specifications. Further, flow paths shown in accompanying drawings are exemplary; flow paths can change depending on placement and design of influent/effluent ports, baffles, and conduits defined below. Also, the influent/effluent ports are shown as circular herein for ease of description. However, the influent/effluent ports may be of any size/shape.

Generally, the permeable reactive weir is a chamber, where the chamber is defined by one or more outer walls. The chamber accommodates filter media that may be renewed or changed to address local environmental concerns, erosion, and/or wear and tear. Fluid flow may be directed through the permeable reactive weir by at least one influent and at least one effluent port, baffles, and/or a valvular conduit or other similar mechanism.

Figure 1A:
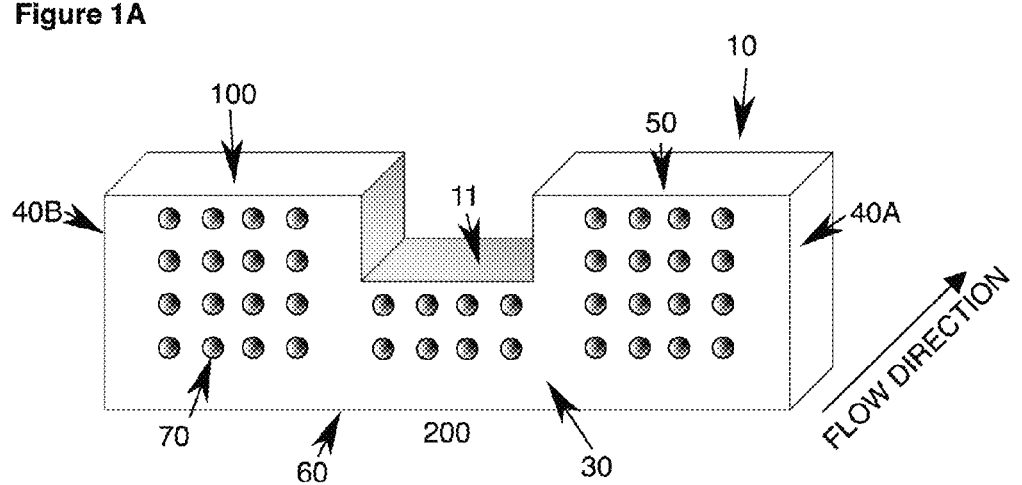
FIG. 1A is a perspective view of an exemplary weir.
Figure 1B:
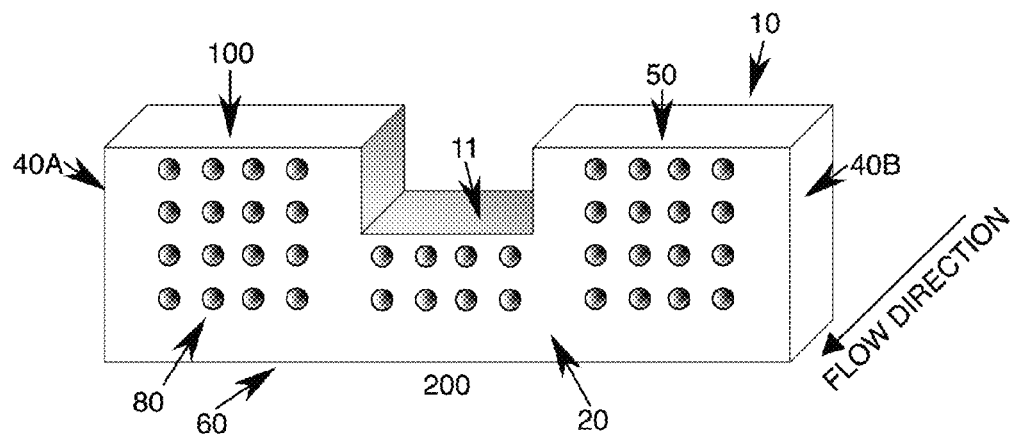
FIG. 1B is a perspective view of an exemplary weir.

Referring to FIGS. 1A-1B, 4, in an exemplary embodiment, the permeable reactive weir ("Weir") (10) is a chamber (100) defined by a downstream-wall (20), an upstream-wall (30), a pair of end walls (40A, 40B), a top-wall (50), and a base (60). Preferably, the downstream-wall (20), upstream-wall (30), and end walls (40A, 40B) are upright. The top-wall (50) may be a removable cover plate. The base (60) and/or end walls (40A, 40B) may be anchored to the waterway using any known anchoring method such as steel reinforced concrete footings with post-tensioning embedded within the stream bank, and/or pre-stressed bedrock anchors allowing water to flow under the Weir (10) through a natural streambed or engineered streambed (200) (i.e., engineered hyporheic zone).

Fluid will enter the Weir (10) through at least one influent port (70) and exit through at least one effluent port (80). Influent (70) and effluent (80) ports may be closable allowing external control of fluid flow through the Weir (10). The top-wall (50) may define at least one influent port (70).

Figure 1C:
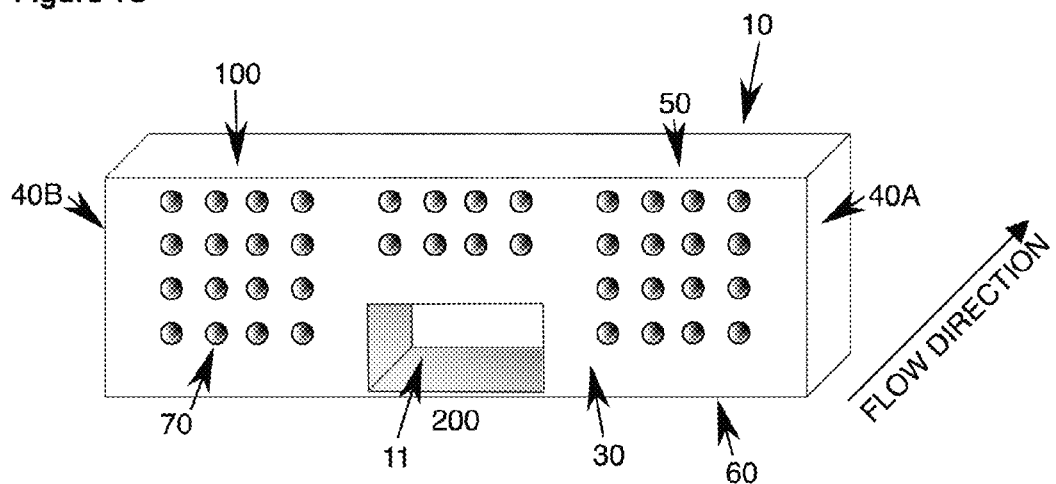
FIG. 1C is a perspective view of an exemplary weir.
Figure 1D:
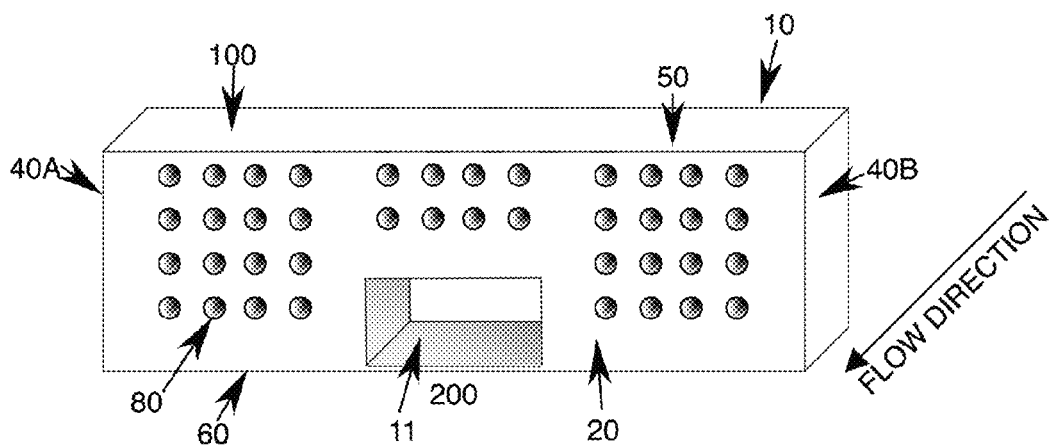
FIG. 1D is a perspective view of an exemplary weir.

The downstream-wall (20) and upstream-wall (30) may define at least one low-flow bypass (11) to allow fish or other aquatic life to bypass the Weir (10) during a dry season, for example. Referring to FIGS. 1A and 1B, in one embodiment, the downstream-wall (20), upstream-wall (30), and top-wall (50) may define at least one low-flow bypass (11) where the low-flow bypass (11) is a depression. Referring to FIGS. 1C and 1D, in another embodiment, the Weir (10) may be configured such that at least one low-flow bypass (11) is created between the top-wall (50) and the base (60).

Although the low-flow bypass (11) is shown as a rectangular shape in the exemplary drawings, it should be noted that the number, shape, size, and location of the low-flow bypass (11) will depend on local environmental conditions. Preferably, when located on the top of the Weir (10) the low-flow bypass (11) is shaped as a rectangle, cipoletti (notch with sloped sides), or v-shaped notch.

Figure 2A:
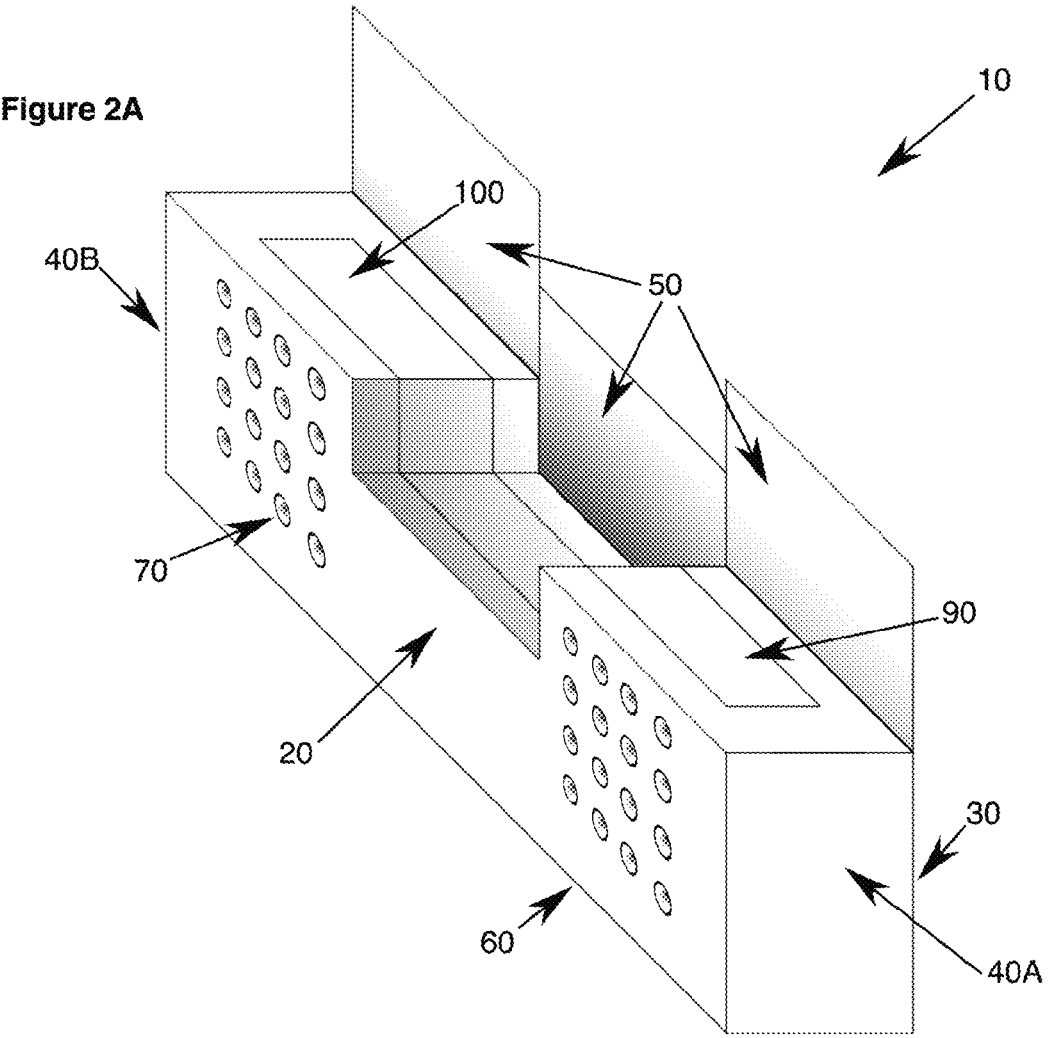
FIG. 2A is a perspective view of an exemplary weir having a replaceable cartridge.
Figure 2B:
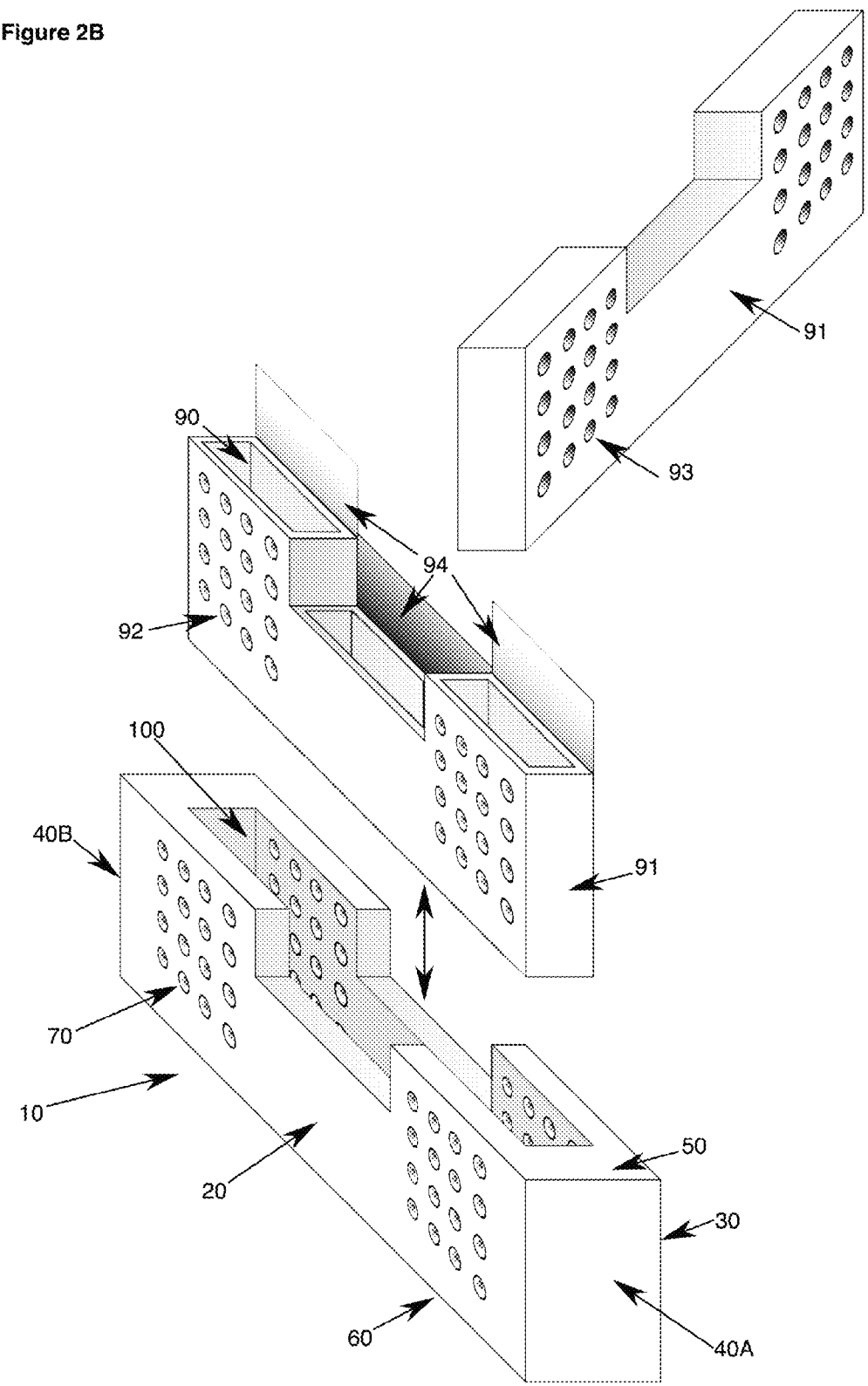
FIG. 2B is a perspective view of an exemplary weir having a replaceable cartridge.

Referring FIGS. 2A-2B, the chamber (100) is large enough to accommodate filter media (90). The filter media (90) may be placed directly into the chamber (100), into a media cartridge (91) that is then placed into the chamber (100), or a combination thereof. Fluid flow through the media cartridge (91) may be controlled by at least one influent port (92) and one effluent port (93). The chamber (100) may be large enough to accommodate a plurality of media cartridges (91) stacked on top of each other, side-by-side, or in any other conceivable configuration.

If the filter media (90) is placed directly into the chamber (100), the filter media (90) may be removed by a vacuum truck or other vacuuming mechanism, for example, and then replaced. Media cartridges (91) may be replaced by sliding the media cartridge (91) out of the chamber (100); an exemplary embodiment is shown in FIG. 2B. In a preferred embodiment, the media cartridge defines at least one access door (94) allowing easy removal of the filter media (90).

Filter media (90) may be comprised of any known or unknown components such as semipermeable membranes, activated carbon, biochar, sand, zeolite, crushed rock, crushed glass, volcanic rock, agricultural and forestry waste, calcium carbonate, metal oxides, zero valent iron, pelletized or non-pelletized wastewater treatment residue, amongst others. The type and amount of filter media (90) used at a given site will depend on the pollutants to be removed and local environmental conditions.

Referring to FIGS. 3A-3B, flow through the Weir (10) may be controlled by a valvular conduit (110) or other similar conduit or valve and/or baffles (120). A valvular conduit (110) and/or baffles (120) may be held within the chamber (100); the media cartridge (91) may be shaped as a valvular conduit (110) and/or contain baffles (120); or a combination thereof. The valvular conduit (110) allows a portion of the fluid entering into the Weir (10) to pass downstream and a portion to return upstream to be treated again. Both the valvular conduit (110) and the baffles (120) increase fluid contact time with filter media (90) increasing the pollutant removal efficiency of the Weir (10).

FIG. 3A shows an exemplary fluid flow path when flow is controlled using a valvular conduit (110). FIG. 3B shows an exemplary fluid flow path when flow is controlled using baffles (120). Flow rate through the Weir (10) will depend upon hydraulic head differences between the upstream and downstream sides of the Weir (10), permeability of filter media (90), the number and position of influent (70, 92) and effluent (80, 93) ports on the Weir (10) and media cartridge (91), valvular conduits (110), and/or baffles (120).

Referring to FIG. 4, the downstream-wall (20) and upstream-wall (30) may define at least one bypass slit (12) allowing fine particles that settle within the Weir (10) to be flushed out. This bypass slit (12) may be of sufficient size to allow fish and other aquatic life to pass through the Weir (10). The Weir (10) may be installed above an engineered hyporheic zone (125). The engineered hyporheic zone (125) may be comprised of filter media having qualities similar to or the same as the filter media used in the Weir (10).

The top-wall (50) may be sloped in the downstream direction to prevent clogging of influent ports (70) that may be located at the top of the Weir (10). This configuration allows debris to be carried downstream as liquid flows over the top of the Weir (10).

A portion of the fluid on the upstream side of the Weir (10) may flow under the Weir (10) into the engineered hyporheic zone (125). Preferably, fluid flowing through the engineered hyporheic zone (125) will be treated, as described above, and rejoin surface fluid flow downstream of the Weir (10). The flow path within the engineered hyporheic zone (125) may be increased by installing one or more sheet piles or other flow diverting structures (130). In some cases, downstream flow over the Weir (10) may cause a scour zone. This problem can be alleviated by locating at least one sheet pile or other flow diverting structures (130) at the edge of the scour zone.

Referring to FIGS. 5A-5B, to prevent debris from clogging influent ports (70,93) a drawdown orifice (140) or hood (150) may be placed over an influent port (70,93) providing a barrier to floating debris. Preferably, the drawdown orifice (140) is a downturned pipe that allows fluid to flow upwards into the pipe and then redirects the fluid into the upstream side of the Weir (10). Preferably, the hood (150) is a curved cover that allows fluid to enter from below the liquid surface while excluding floating debris. It should be noted that a person having ordinary skill in the art will appreciate that other barrier methods, such as screens, may be used.

What is claimed is:
1. A fluid filtration apparatus comprising:
   a chamber, where the chamber is defined by a downstream wall, an upstream wall, a pair of side walls, a base and a removable top wall that covers entirely a top of the chamber;
   at least one influent port located on the upstream wall;
   at least one effluent port located on the downstream wall;
   where the chamber accommodates at least one media cartridge;
   where the at least one media cartridge has at least one influent port and at least one effluent port;
   where the at least one media cartridge configured to slidingly fit into the chamber; and
   where the at least one media cartridge is replaceable and accommodates replaceable filter media.
2. The apparatus of claim 1, where the replaceable filter media is comprised of semipermeable membranes, activated carbon, biochar, sand, zeolite, crushed rock, crushed glass, volcanic rock, agricultural and forestry waste, calcium carbonate, metal oxides, zero valent iron, pelletized or non-pelletized wastewater treatment residue, or a combination thereof.
3. The apparatus of claim 1, wherein the chamber accommodates at least one baffle, at least one valvular conduit, or a combination thereof.
4. The apparatus of claim 1, where the chamber is shaped as a valvular conduit, contains baffles, or a combination thereof.
5. The apparatus of claim 1, where the upstream wall, downstream wall and top wall define at least one low-flow bypass.

6. The apparatus of claim 5, where the at least one low-flow bypass is sufficient in size to accommodate passage of site defined fish and aquatic life.

7. The apparatus of claim 1, where at least one sheet pile is located in a scour zone, where the scour zone is located adjacent to the base and the downstream wall outside of the chamber.

8. The apparatus of claim 1, where the at least one media cartridge has a top wall and the top wall is a removable cover.

9. The apparatus of claim 1, where the at least one media cartridge holds at least one valvular conduit, at least one baffle, or a combination thereof.

10. The apparatus of claim 1, where the at least one media cartridge is a valvular conduit that optionally contains baffles.

11. The apparatus of claim 1, where the upstream wall and downstream wall define at least one bypass slit therein-between.

12. The apparatus of claim 1, wherein the apparatus is installed above an engineered hyporheic zone.

13. The apparatus of claim 12, where the engineered hyporheic zone is comprised of semipermeable membranes, activated carbon, biochar, sand, zeolite, crushed rock, crushed glass, volcanic rock, agricultural and forestry waste, calcium carbonate, metal oxides, zero valent iron, pelletized or non-pelletized wastewater treatment residue, or a combination thereof.

14. The apparatus of claim 1, where the at least one influent port is protected by a drawdown orifice, hood, or combination thereof.

15. The apparatus of claim 1, where the top wall is comprised of at least one influent port.

16. The apparatus of claim 15, where the top wall is sloped in the downstream direction.

17. A fluid filtration apparatus for a waterway, comprising:
    a weir that includes an upstream wall, a downstream wall, side walls, a base and a top opening, the upstream wall, the downstream wall and the side walls each include an outside surface and an inside surface;
    a chamber located inside the weir, defined by the inside surfaces of the upstream wall, the downstream wall, the side walls and the base;
    one or more top walls that singularly or collectively cover all or a portion of the top opening;
    at least one influent port hole formed on the upstream wall configured to allow water flowing against the upstream wall to flow into the chamber;
    at least one effluent port hole formed on the downstream wall configured to allow water in the chamber that flows against the inside surface of the downstream wall to exit the chamber and the weir;
    filter media located in the chamber; and
    whereas when the weir is placed in the waterway with the upstream wall facing upstream and the influent port hole is at least partially submerged, water flowing against the outside surface of the upstream wall may flow into the influent port hole and directly across the filter media in the chamber and undergo filtration and then may flow against the inside surface of the downstream wall and exit the weir through the effluent port hole.

18. The apparatus as recited in claim 17, wherein the filter media is placed in one or more media cartridges configured to fit into the chamber, each media cartridge includes at least one influent port and at least one effluent port.

19. The apparatus as recited in claim 17, further including a bypass.

20. The apparatus as recited in claim 19, wherein the bypass is a slit formed between the upstream wall and the downstream wall of the weir.

21. The apparatus as recited in claim 17, further including a drawdown orifice, a hood or a combination thereof located over at least one influent port formed on the upstream wall of the weir.

* * * * *